United States Patent
Thonangi et al.

(10) Patent No.: US 10,754,832 B2
(45) Date of Patent: Aug. 25, 2020

(54) EFFICIENT PHYSICAL KEY-VALUE SCHEME FOR PERSISTING VIRTUAL DATABASE DATA

(71) Applicant: Nicira, Inc., Palo Alto, CA (US)

(72) Inventors: Risi Thonangi, Sunnyvale, CA (US); Harold Vinson C. Lim, Union City, CA (US)

(73) Assignee: Nicira, Inc., Palo Alto, CA (US)

( * ) Notice: Subject to any disclaimer, the term of this patent is extended or adjusted under 35 U.S.C. 154(b) by 259 days.

(21) Appl. No.: 15/881,650

(22) Filed: Jan. 26, 2018

(65) Prior Publication Data

US 2019/0236170 A1 Aug. 1, 2019

(51) Int. Cl.
*G06F 16/21* (2019.01)
*G06F 9/455* (2018.01)

(52) U.S. Cl.
CPC ........ *G06F 16/212* (2019.01); *G06F 9/45558* (2013.01); *G06F 2009/45583* (2013.01); *G06F 2009/45595* (2013.01)

(58) Field of Classification Search
None
See application file for complete search history.

(56) References Cited

U.S. PATENT DOCUMENTS

| | | | | |
|---|---|---|---|---|
| 7,877,354 B2* | 1/2011 | Dane | ................... | G06F 21/6227 707/613 |
| 8,281,321 B2* | 10/2012 | Beck | ................... | G06F 16/9574 719/318 |
| 8,595,267 B2* | 11/2013 | Sivasubramanian | ... | G06F 16/20 707/803 |
| 8,799,291 B2* | 8/2014 | Lee | ......................... | G06F 16/22 707/741 |
| 9,026,562 B2* | 5/2015 | Rawal | ................... | G06F 16/256 707/803 |
| 9,418,091 B2* | 8/2016 | Li | ......................... | G06F 16/221 |
| 10,331,641 B2* | 6/2019 | Zhang | ................... | G06F 3/0674 |

* cited by examiner

*Primary Examiner* — Kim T Nguyen
(74) *Attorney, Agent, or Firm* — Patterson + Sheridan, LLP

(57) ABSTRACT

A composite database containing virtualized objects of a transport node in a virtualized network, and methods pertaining thereto is disclosed. The composite database supports each of many clients having their own database values. The composite database is formed by augmenting a key-value database to have an augmented key that comprises an original key, indicating the type of object stored, concatenated with a list of database identifiers. The composite database stores at the augmented key, values of objects in the database that pertain to each database identifier in the augmented key, where each object is in serialized form. Accessing the database includes scanning the database for a list of augmented key-value pairs containing a given key. Getting a database record includes specifying a key and a database identifier. The list of augmented key-value pairs is searched for the record having the specified database identifier.

20 Claims, 13 Drawing Sheets

NestDB

| K' = O^ID^(list of d) | V |
|---|---|
| K'_1 | V_1 |
| K'_2 | V_2 |
| ⋮ | ⋮ |
| K'_N | V_N |

FIG. 3B

EFFICIENT PHYSICAL KEY-VALUE SCHEME FOR PERSISTING VIRTUAL DATABASE DATA

BACKGROUND

In much the same way that server virtualization programmatically creates, snapshots, deletes and restores software-based virtual machines (VMs), NSX-T network virtualization programmatically creates, snapshots, deletes, and restores software based virtual networks.

In network virtualization, a network hypervisor reproduces the complete set of protocol layers from Layer 2 to Layer 7 in software. Consequently, these services can be assembled in any arbitrary combination to produce a virtual network in seconds.

The network virtualization implements three separate planes, management plane 104, control plane 106/108, and data plane 112 as depicted in FIG. 1A. Management plane 104 allows the platform to process large-scale concurrent API requests from a cloud layer. Control plane 106/108 keeps track of the real-time virtual networking and security state of the system. Control plane 106/108 is split into two parts, a central control plane 106 and a local control plane (LCP) 108. LCP 108 runs on the compute endpoints, which are known as transport nodes 110. Data plane 112 includes a host switch, which enables the overlay network, as well as traditional VLAN-based topology.

Transport node 110 hosts various LCP daemons and a local data plane that includes a forwarding engine. Transport node 110 further includes storage, which contains all of the data for defining and controlling the behavior of the transport node. All of the daemons and processes running in the transport node interact with the storage via an established interface to carry out their assigned functions.

In a cloud setting, a gateway node, which manages a number of virtual machines in the cloud, uses, in one embodiment, a database for storage and each virtual machine has a client that reads and writes its own data from the database. The gateway node allocates a separate virtual database for each virtual machine to ensure that the virtual machine cannot alter another VM's database.

It is highly likely that each virtual machine has some set of identical configurations. For example, the same logical router port configuration is used several VMs managed by the gateway. Each of these identical configurations causes separate copies to be maintained for each virtual database, which is wasteful and inefficient.

BRIEF DESCRIPTION OF DRAWINGS

FIG. 3B depicts the layout of a database in the embodiment of FIG. 3A.

DETAILED DESCRIPTION

Figure 1A:
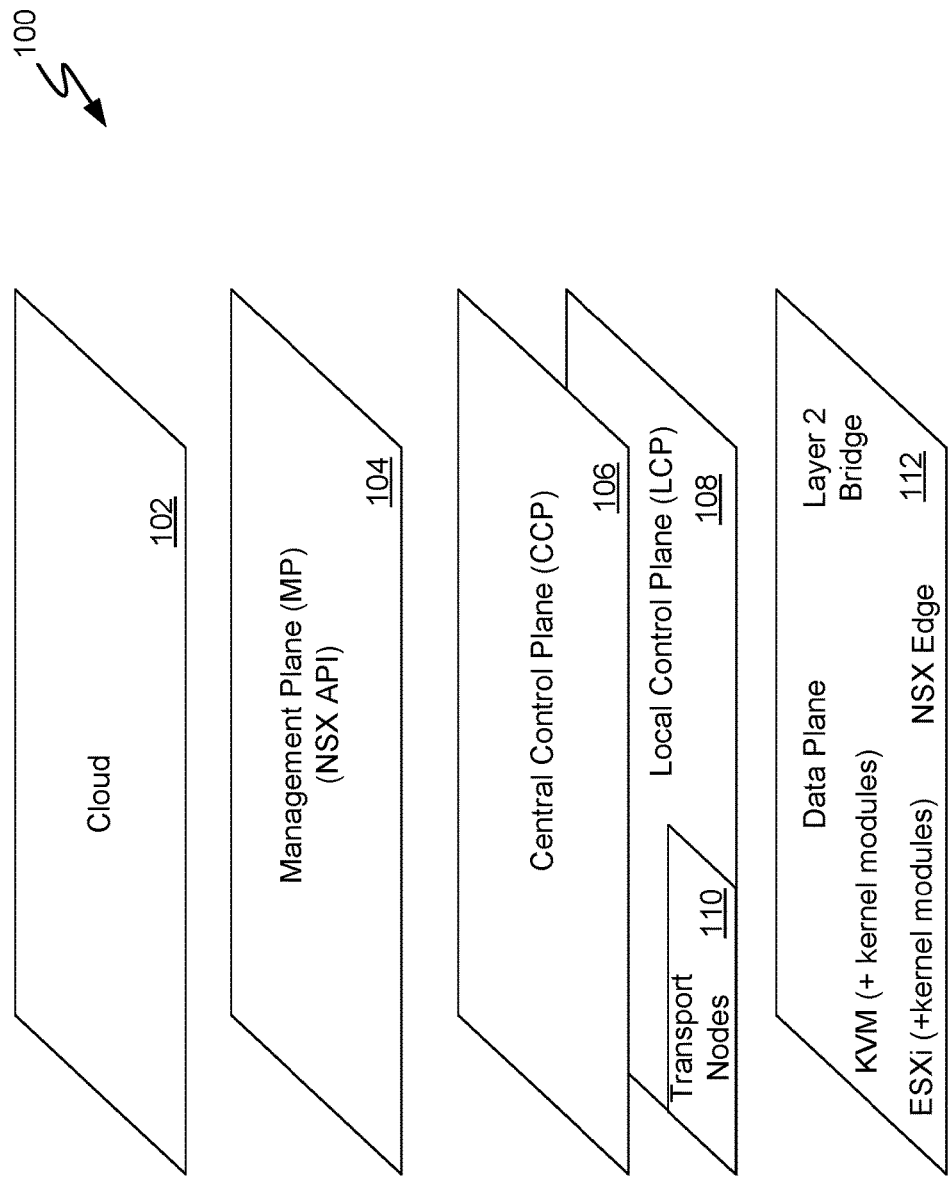
FIG. 1A depicts an architecture for implementation of network virtualization as three separate planes, management, control, and data.
Figure 1B:
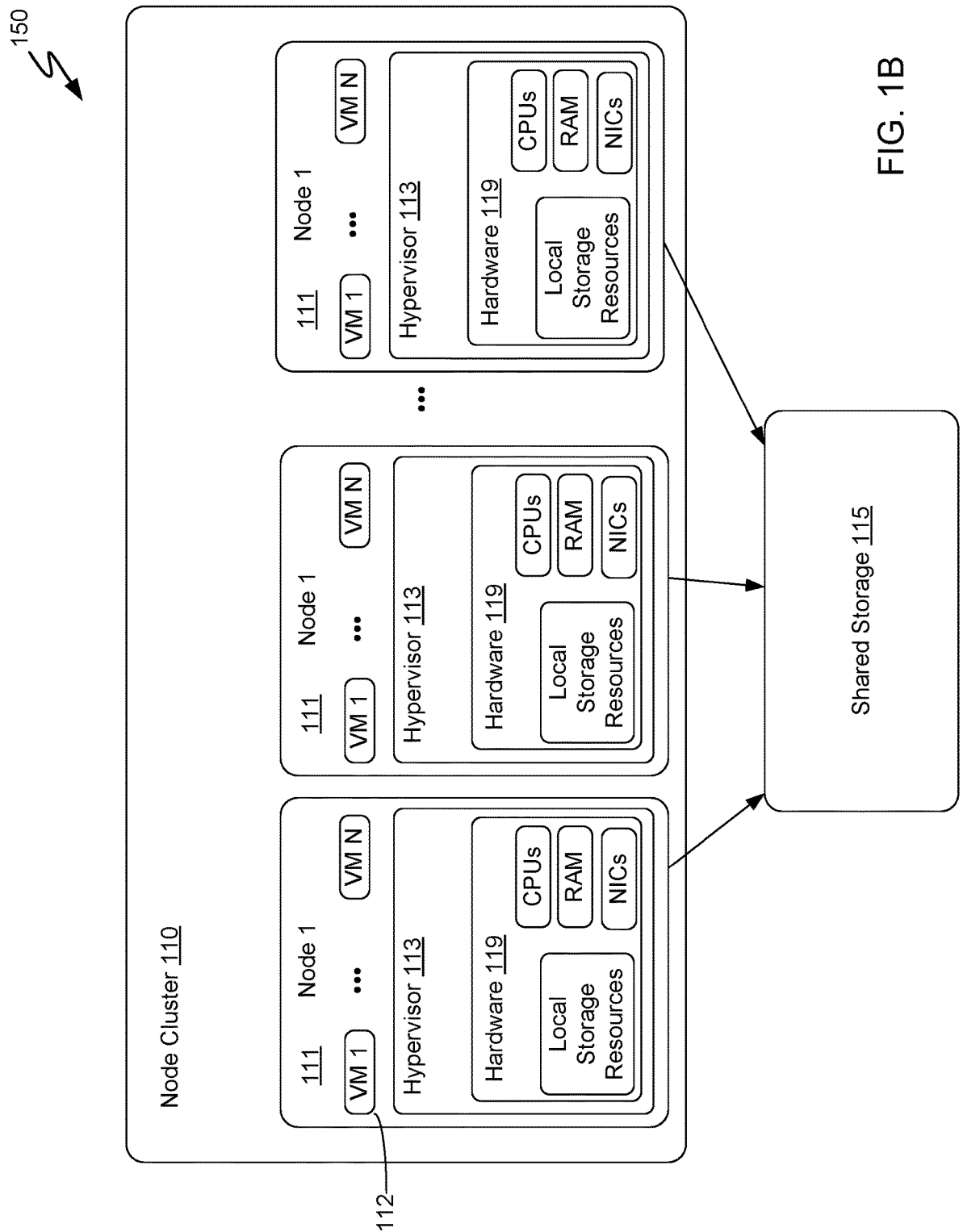
FIG. 1B depicts a cluster of nodes supporting virtual machines in which embodiments described herein may operate.

FIG. 1B depicts a cluster 110 of nodes supporting virtual machines in which embodiments described herein may operate. As depicted in the configuration 150 of FIG. 1B, each node 111 includes a virtualization layer or hypervisor 113, and hardware 119 (which includes the SSDs 117 and magnetic disks 118 of a node 111). Through hypervisor 113, node 111 is able to launch and run multiple VMs 112. Hypervisor 113, in part, manages hardware 119 to properly allocate computing resources (e.g., processing power, random access memory, etc.) for each VM 112. Each node 111 connects to shared storage 115.

Figure 2:
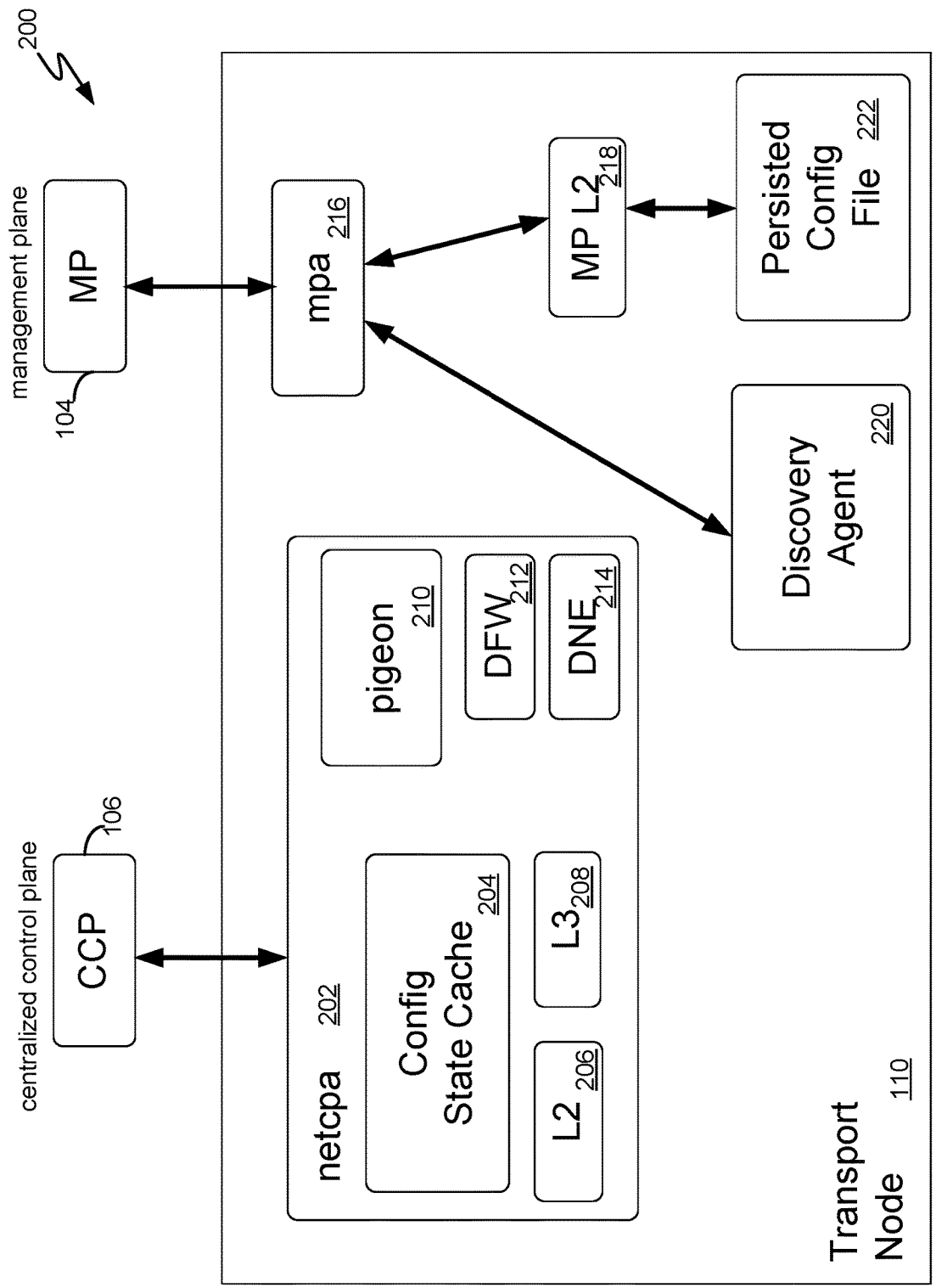
FIG. 2 depicts an arrangement of daemons and processes in a transport node in one embodiment.

FIG. 2 depicts an arrangement of daemons and processes in a transport node in one embodiment. Transport node 110 includes a management plane agent 216, a management plane (MP) L2 218, a discovery agent 220, a persisted configuration file 222, and a network control plane agent netcpa 202. Management plane agent 216 interacts with MP L2 218, discovery agent 220 and persisted configuration file 222 within transport 110 node and management plane 104 external to the node. Network control plane agent 202 interacts with centralized control plane 106 and includes a configuration state cache 204, L2 services 206 and L3 services 208, a Pigeon API 210, a distributed firewall (DFW) 212 service and a distributed network encryption (DNE) 214 service.

Figure 3A:
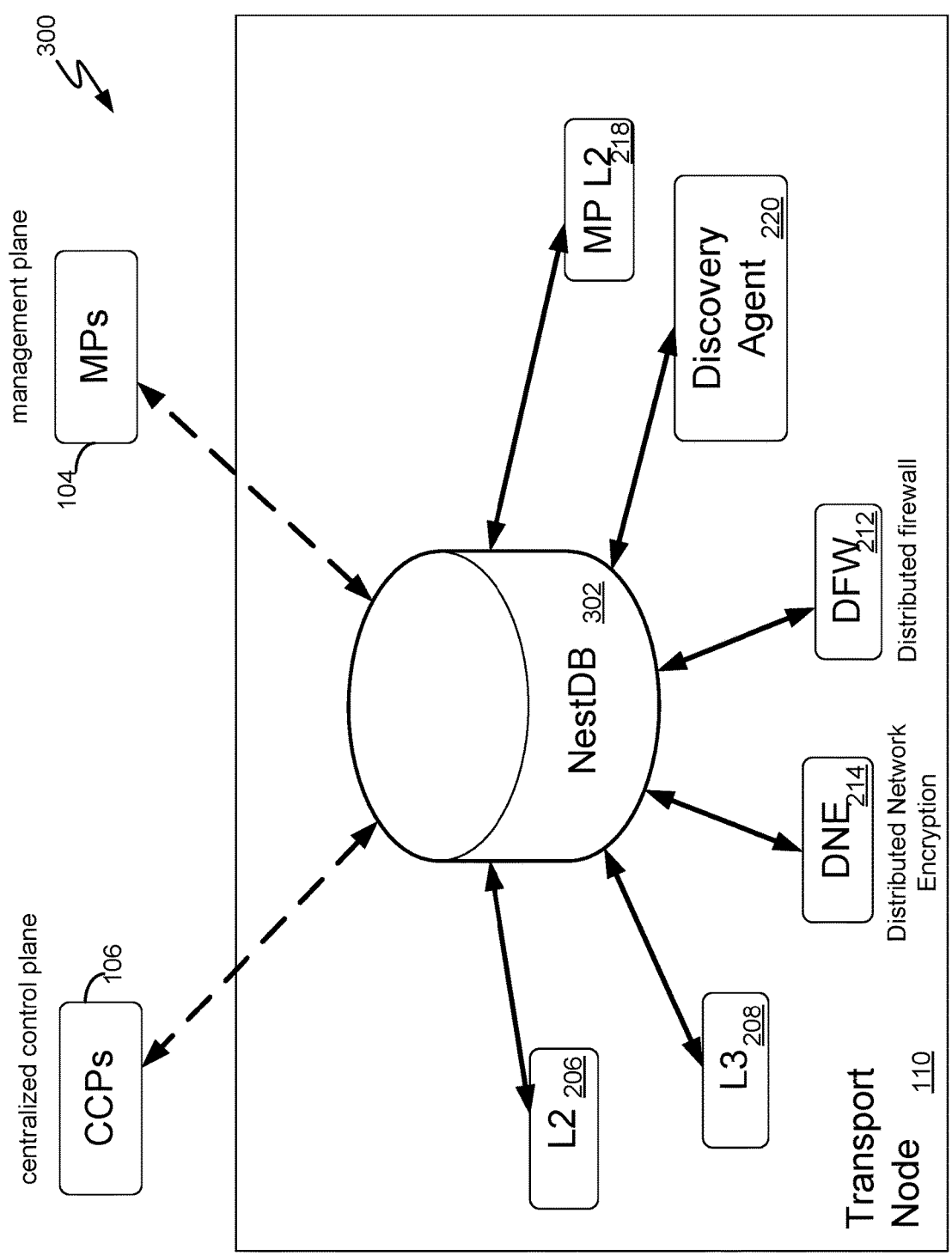
FIG. 3A depicts an arrangement of daemons and processes in a transport node in another embodiment.

FIG. 3A depicts an arrangement of daemons and processes in a transport node in another embodiment. In this embodiment, transport node 110 includes a database (NestDB) 302, along with L2 services 206 and L3 services 208, MP L2 service 218, discovery agent 220, DNE 214 service and DFW 212 service. Centralized control plane 106 and management plane 104 interact directly with NestDB 302. In one embodiment, NestDB 302 stores objects as serialized strings. If a single bit in the serialized string needs to be changed, then the string for the entire object is read from the disk, de-serialized, changed, serialized and written back to the disk.

As mentioned above, when the database, such as NestDB 302, is shared among several virtual machines, it is highly likely that the same network configuration is shared by the virtual machines. Instead of maintaining copies of the database for each virtual machine, the database configuration is altered as depicted in FIG. 3B to become a composite database.

Figure 3B:
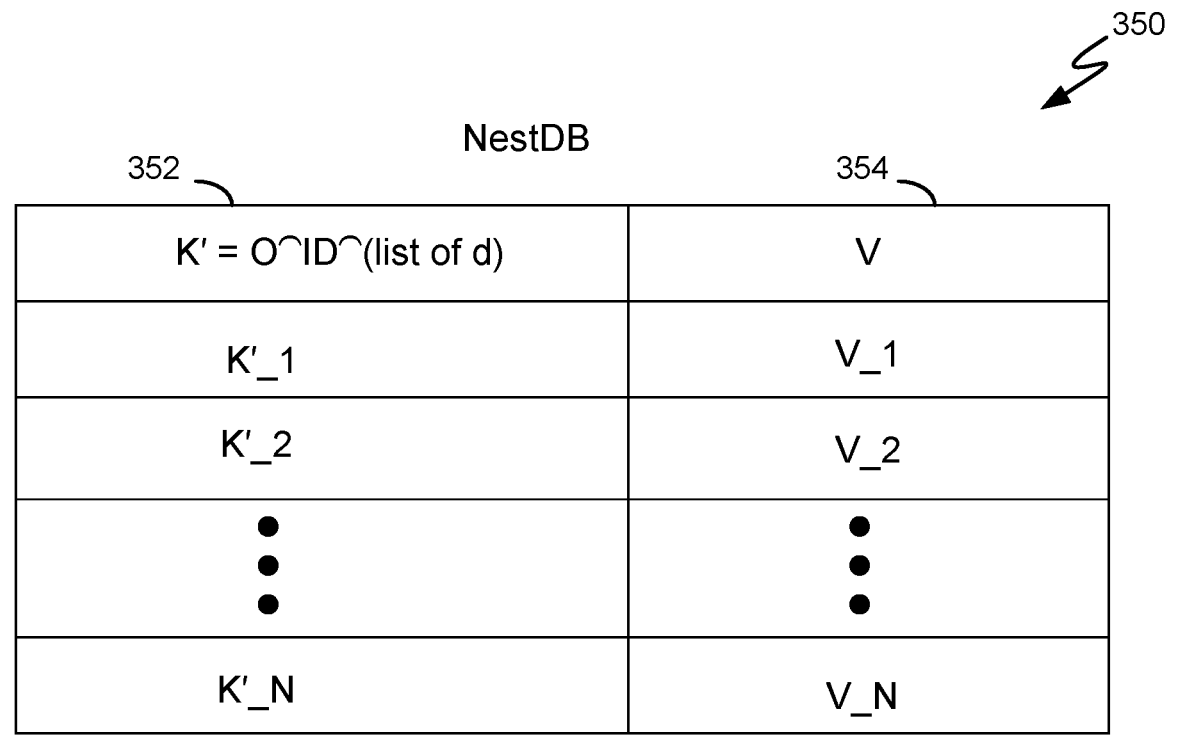

FIG. 3B depicts the arrangement of the NestDB as a (key, value) store that handles these separate copies in a more efficient manner, where the value is a serialized object. In the figure, the key K is the concatenation of an object type O and a unique identifier ID (O^ID), which is a particular instance of the object type. (The symbol, ^, indicates concatenation.) However, to handle the multiple copies of the database without duplication, the key K is altered to become an augmented key K', by having a set of virtual database IDs (list of d) appended to the key K. Thus, the augmented key K' is K ⌢ (list of d), where the list of virtual database identifiers (list of d) is converted to a string and appended to the key. The augmented (key, value) pair then becomes (K', V). The string can be created in various ways. In one embodiment, the string is created in a single operation by a bitmap encoding. In another embodiment, a difference-based compression scheme that stores variable integer (varint) encoding of the first occurring virtual database identifier followed by delta increments for succeeding identifiers.

FIGS. 4 through 14 depict how the augmented key value pair (K', V) is used to carry out various functions, such as adding and deleting records to and from the composite database.

Figure 4:
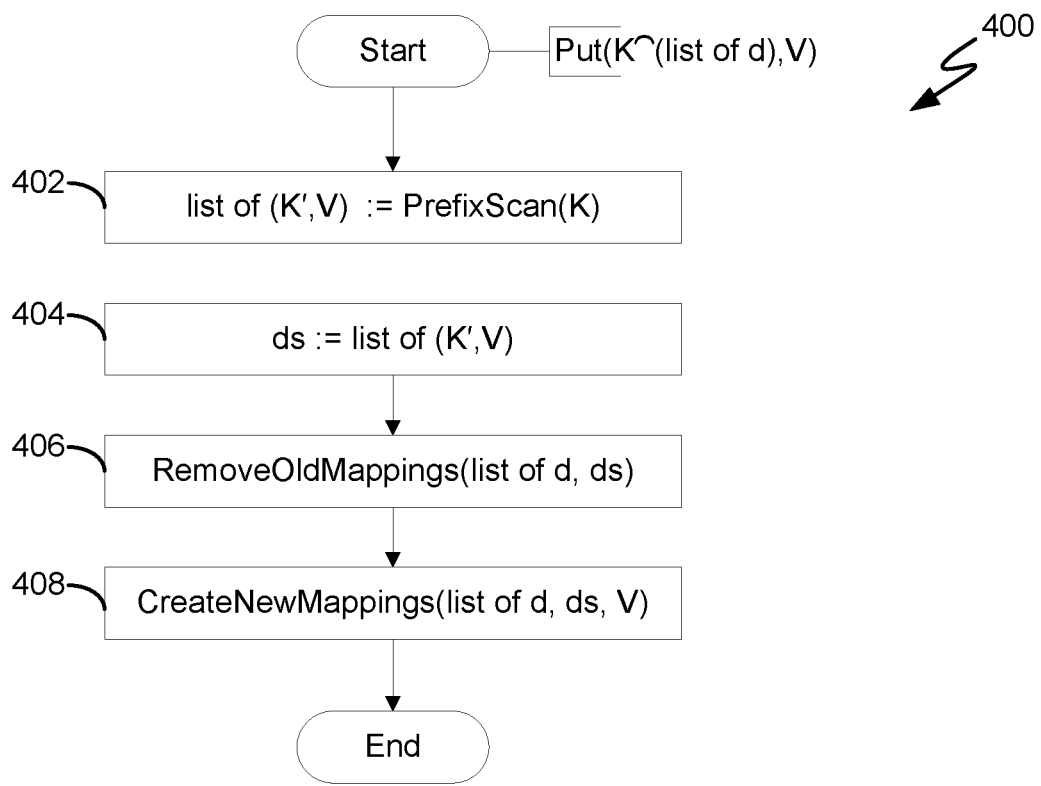
FIG. 4 depicts a flow for putting a value for a set of virtual database identifiers (list of d) having a key K.

FIG. 4 depicts a flow 400 for putting (i.e., setting) a value for a list of virtual database identifiers (list of d) having a key K. In step 402, the NestDB server finds a list of augmented key value pairs (list of (K', V)) by a function PrefixScan(K), described in reference to FIG. 10, with the argument K acting as a filter and with K' being defined as K ⌢ (list of d') and (list of d') being the list of database identifiers for K' and to distinguish this list from any given (list of d). In step 404, the NestDB server stores the list that was found by the PrefixScan(K) function in the variable ds. In step 406, the NestDB server calls a RemoveOldMappings function, described in reference to FIG. 13, to remove the old mappings in the list of (K', V) pertaining to the given list of d. In step 406, the NestDB server enters a set of new mappings for the list of d into the composite database using the CreateNewMappings(list of d, ds, V) function, which is described in reference to FIG. 14.

Figure 5:
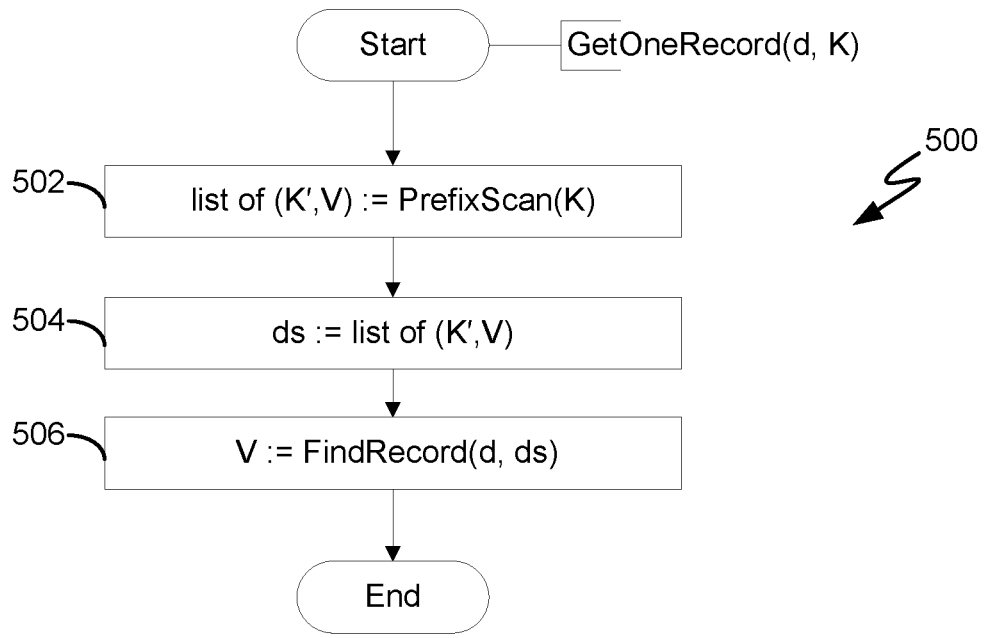
FIG. 5 depicts a flow for getting a single record from virtual database d.

FIG. 5 depicts a flow 500 for getting a single record from virtual database identified by d. In step 502, the NestDB server calls the PrefixScan(K) function to return a list of augmented key, value pairs, list of (K', V). The NestDB server then stores the list the list in variable ds in step 504. Next, in step 506, the NestDB server finds the record for database identifier d in ds and returns the value V using the FindRecord(d, ds) function, described in reference to FIG. 11.

Figure 6:
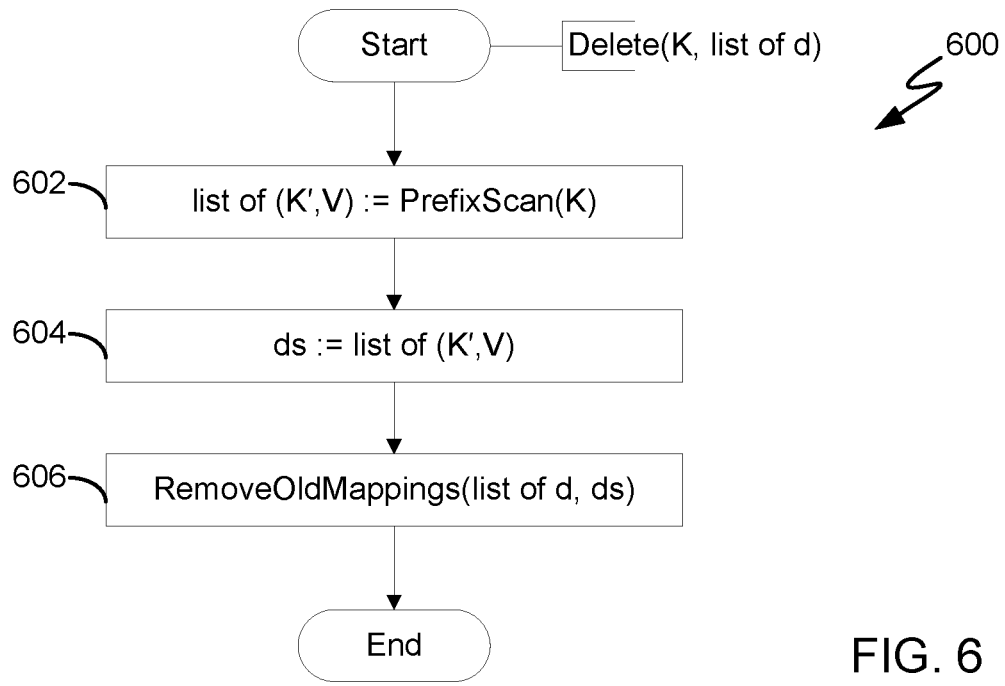
FIG. 6 depicts a flow for deleting K for a list of d.

FIG. 6 depicts a flow 600 for deleting K for a given list of d. In step 602, the NestDB server finds a list of records (K', V) for the given K by the PrefixScan(K) function. In step 604, the NestDB server stores the list of records the list in variable ds. In step 606, the NestDB server calls the function RemoveOldMappings(list of d, ds) to remove the list of d for records with K from the composite database.

Figure 7:
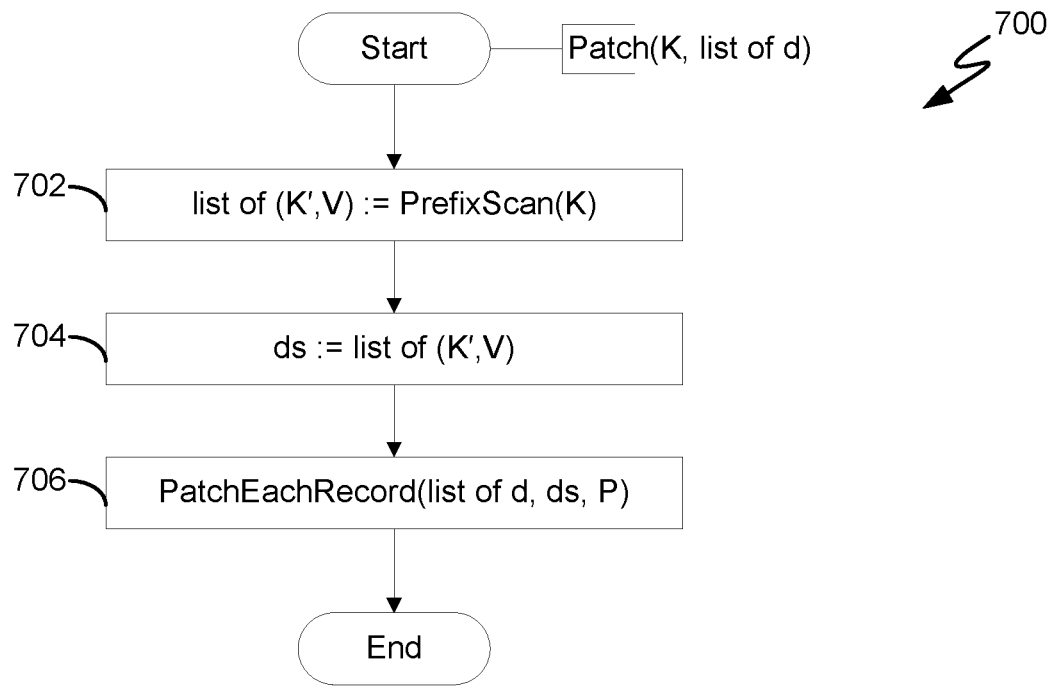
FIG. 7 depicts a flow for patching K with a list of d.

FIG. 7 depicts a flow 700 for patching K with a list of d. In step 702, the NestDB server finds a list of records (K', V) for the given K. In step 704, the NestDB server stores the list in the variable ds. In step 706, the NestDB server calls the function PatchEachRecord(List of d, ds, P), described in reference to FIG. 12, which patches each record in d in the list of d, using P as a patch transformation function.

Figure 8:
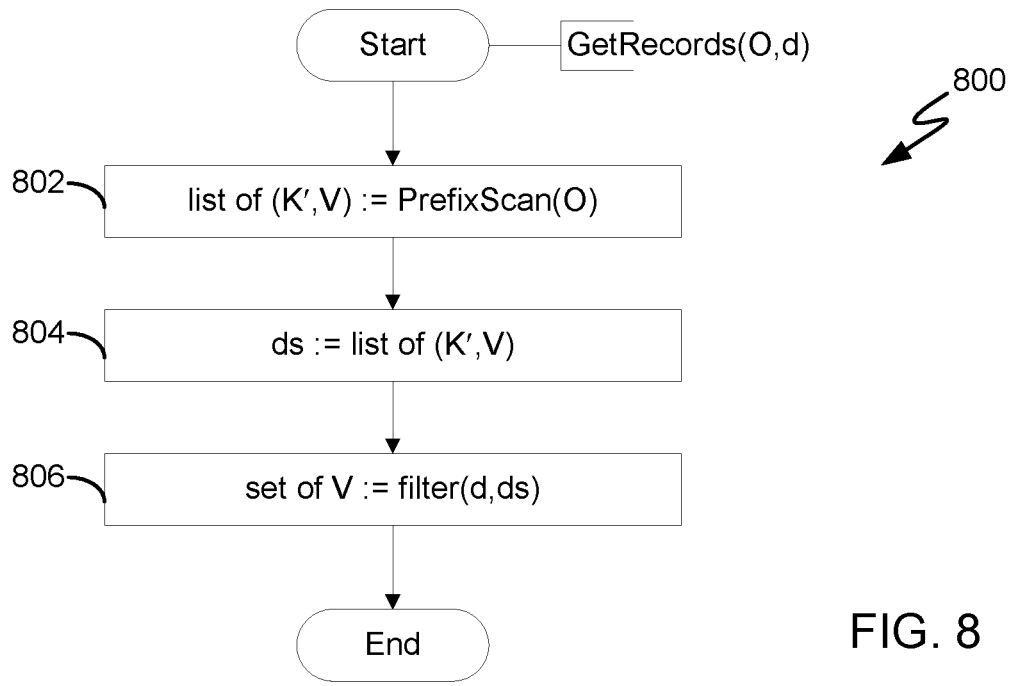
FIG. 8 depicts a flow for getting records of object type O from database d.

FIG. 8 depicts a flow 800 for getting records of object type O from database d. In step 802, the NestDB server calls the PrefixScan function to find the list of records with the having O in the key K. In step 804, the NestDB server stores the results in ds. In step 806, the NestDB server filters the results ds based on the given database identifier d to find the records of object type O in the key using the filter(d, ds) function and returns the filtered set of values V. The filter(d, ds) function is further described in reference to FIG. 15.

Figure 9:
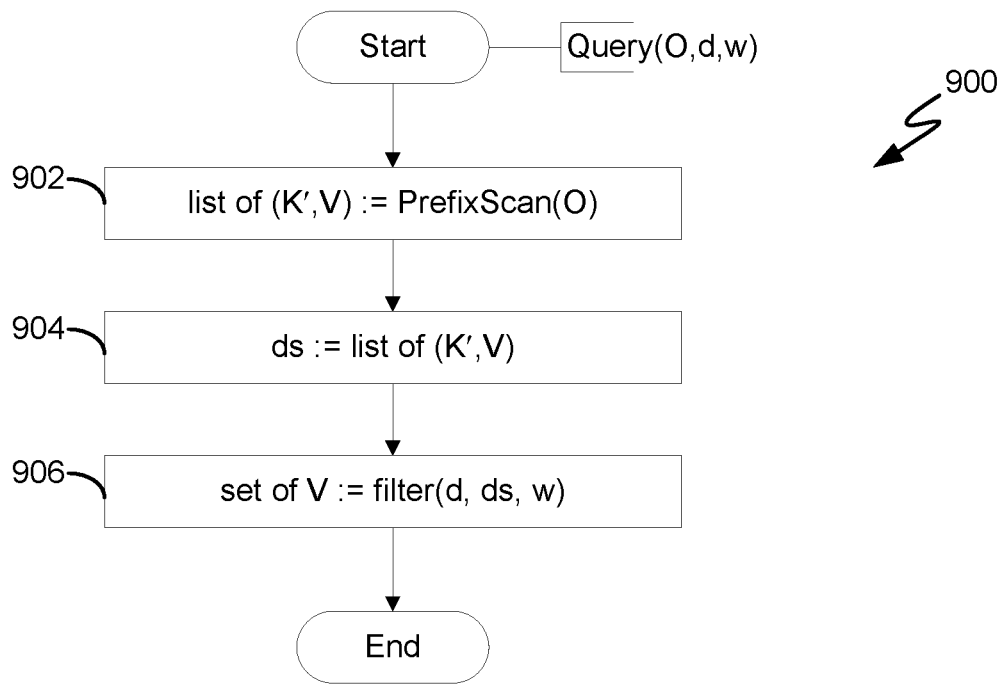
FIG. 9 depicts a flow for querying the database for records of object type O from database d with condition w.

FIG. 9 depicts a flow 900 for querying the composite database for records of object type O from database identifier d with condition w. In step 902, the NestDB server calls the PrefixScan function to find the list of (K', V) having the given object type O in the key K. In step 904, the NestDB server stores the list in variable ds. In step 906, the NestDB server filters the list of records using function filter(d, ds, w) to find the set with object type O in d meeting condition w and returns the filtered set of values V. The filter(d, ds, w) function is further described in reference to FIG. 16.

Figure 10:
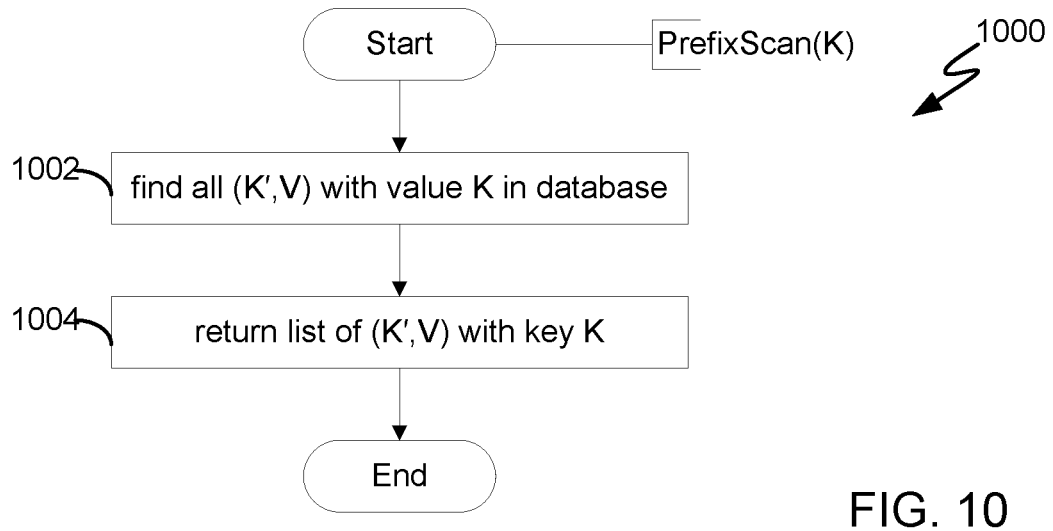
FIG. 10 depicts the PrefixScan function.

FIG. 10 depicts steps 1000 of the PrefixScan(K) function executed by the NestDB server. In step 1002, all of the augmented (K', V) pairs with value K are found in the composite database. In step 1004, the list of (K', V) with key K is returned to the caller.

Figure 11:
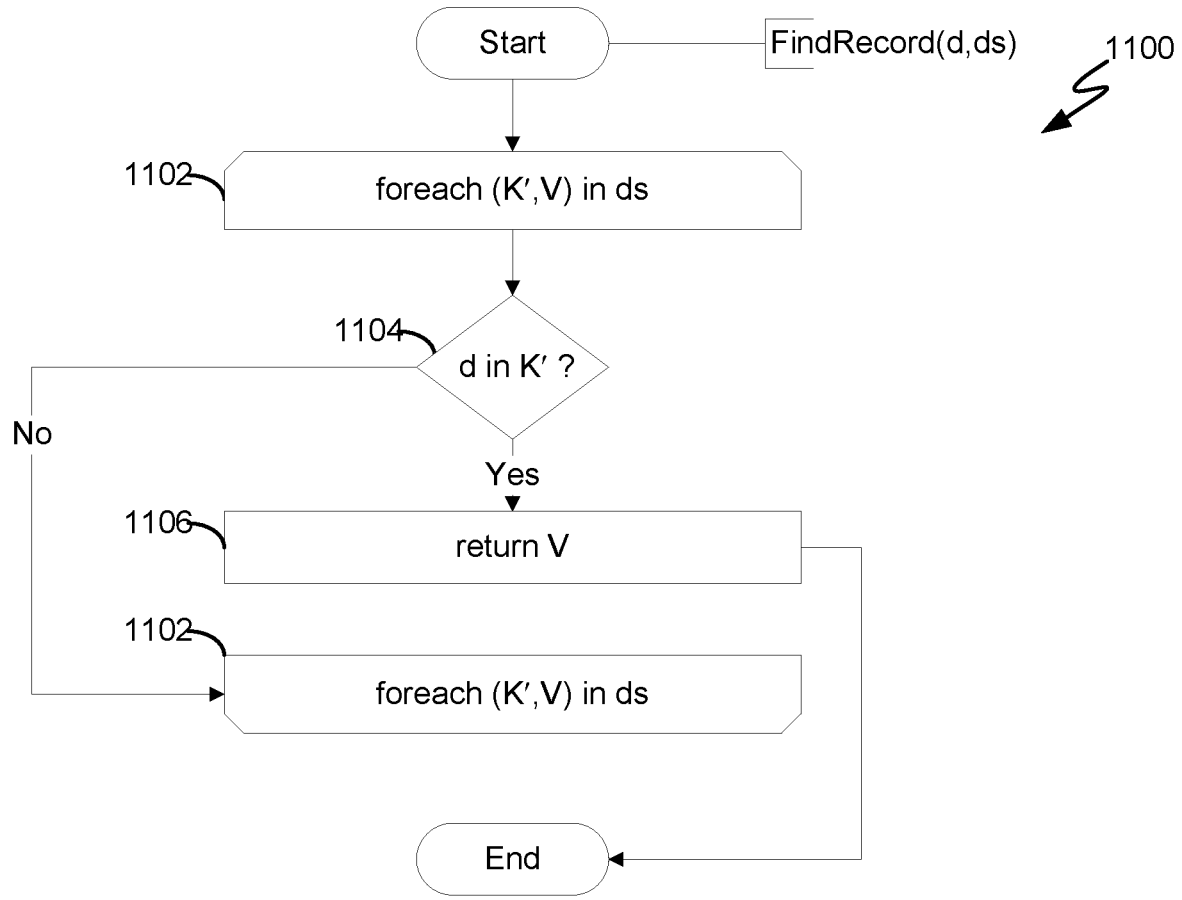
FIG. 11 depicts the FindRecord function.

FIG. 11 depicts a flow 1100 for the FindRecord(d, ds) function executed by the NestDB server. In step, 1102, the function starts an iterator over each (K', V) in ds. In step 1104, the function tests to determine whether d is in the current K'. If so, then the function executes step 1106 returning the value V. Otherwise, the function continues iterating according to the iterator. Thus, the function searches the (K', V) list in ds and return a value V the first time d it finds d in K'.

Figure 12:
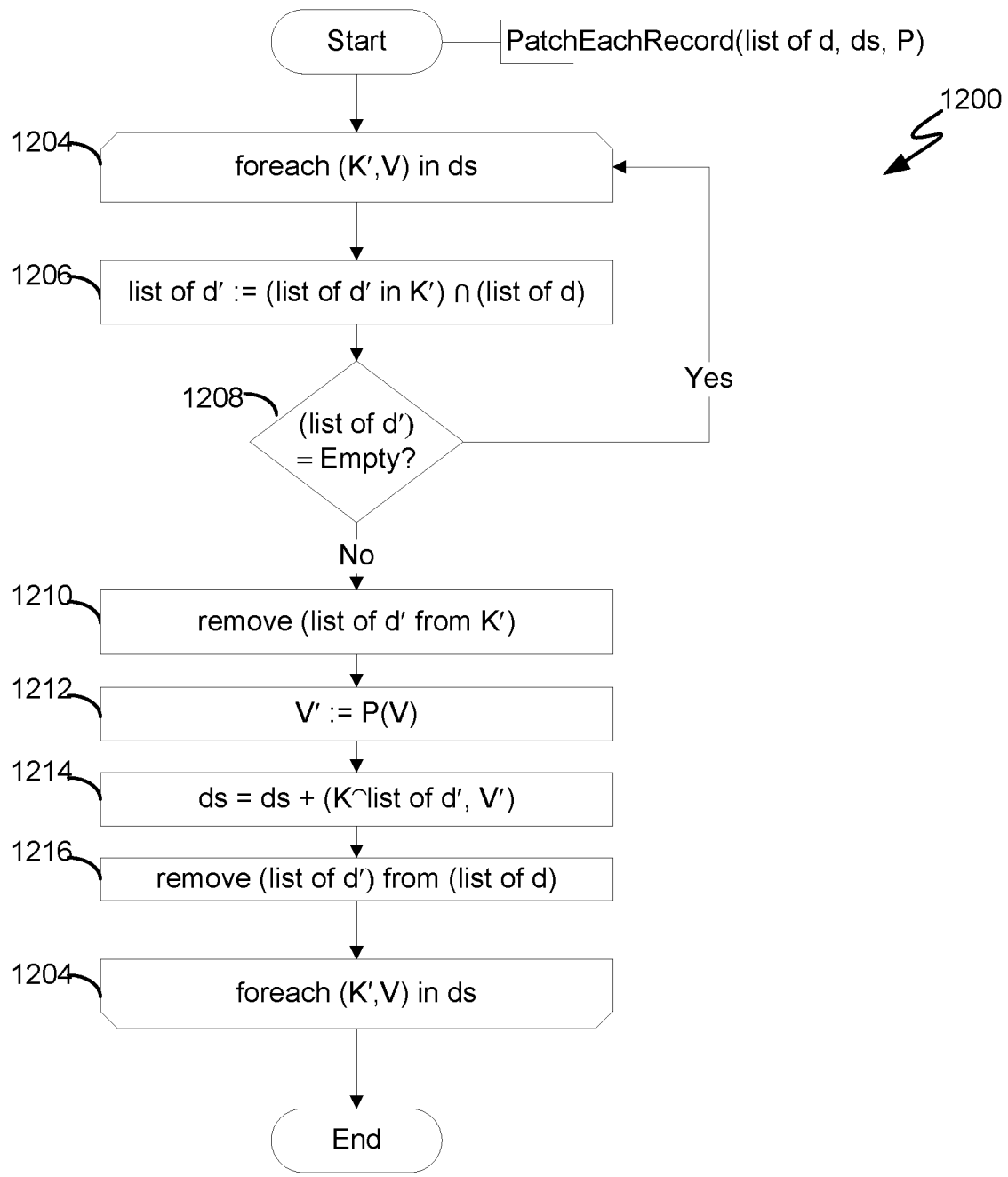
FIG. 12 depicts the PatchEachRecord function.

FIG. 12 depicts a flow 1200 for the PatchEachRecord(list of d, ds, P) function, in which the NestDB server updates one or more fields of an object already in the database. In step 1204, the function begins an iterator that iterates over each (K', V) in ds. In step 1206, the function obtains a list of d' which is an intersection of the (list of d' in K') and the given (list of d). In step 1208, the function tests whether or not the (list of d') obtained from the intersection is empty. If not, then in step 1210, the function removes the (list of d') from augmented key K'. In step 1212, the function applies a transformation function P to the value V to transform it to the value V'. In step 1214, a new value ds is formed from the existing value ds by adding (K ⌢ (list of d', V') to ds. In step 1216, the function removes (list of d') from the given (list of d). If in step 1208, the function finds that the result of the intersection computed in step 1206 is empty, it continues the iteration with the next (K', V) in ds.

Figure 13:
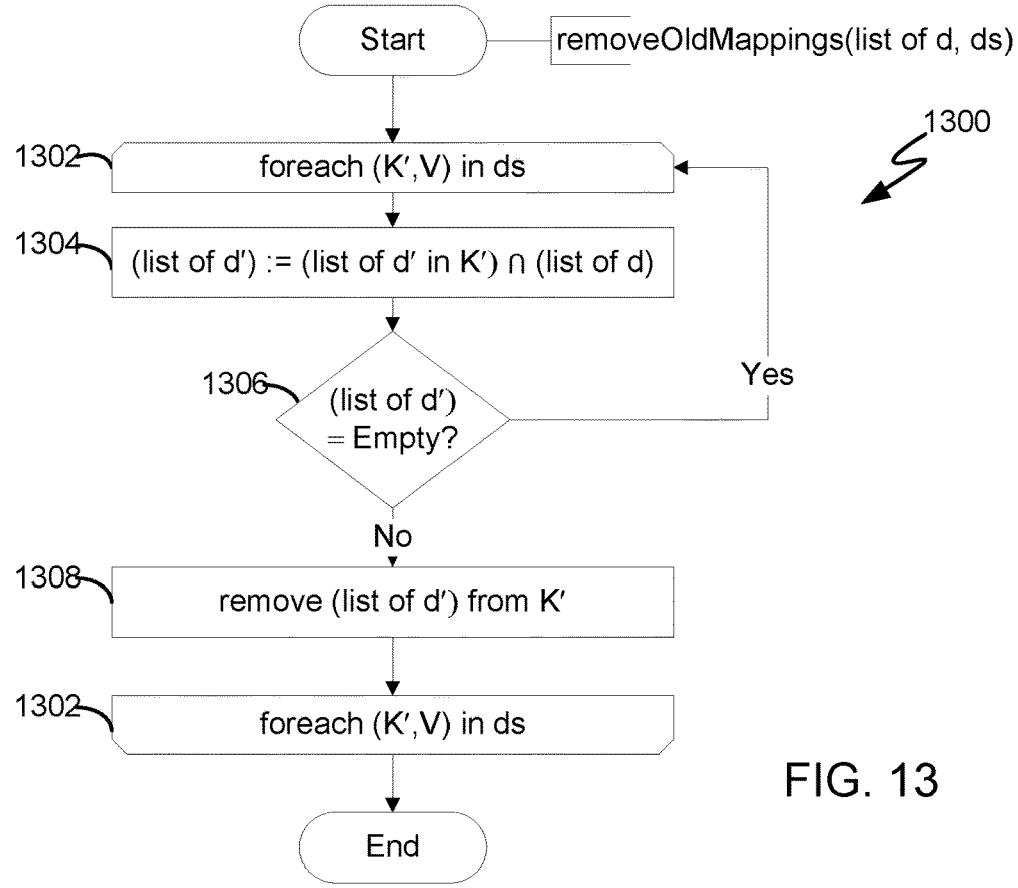
FIG. 13 depicts the removeOldMappings function.

FIG. 13 depicts flow 1300 for the removeOldMappings (list of d, ds) function executed by the NestDB server. In step 1302, the function starts an iterator over the (K', V) in ds. In step 1304, the function computes a (list of d') by finding the intersection of (list of d' in K') and the given (list of d). In step 1306, the function tests whether or not the (list of d') computed from the intersection is empty. If not, then in step 1306, the function removes (list of d') from K'. If the (list of d') is empty, then the function continues the iteration 1302.

Figure 14:
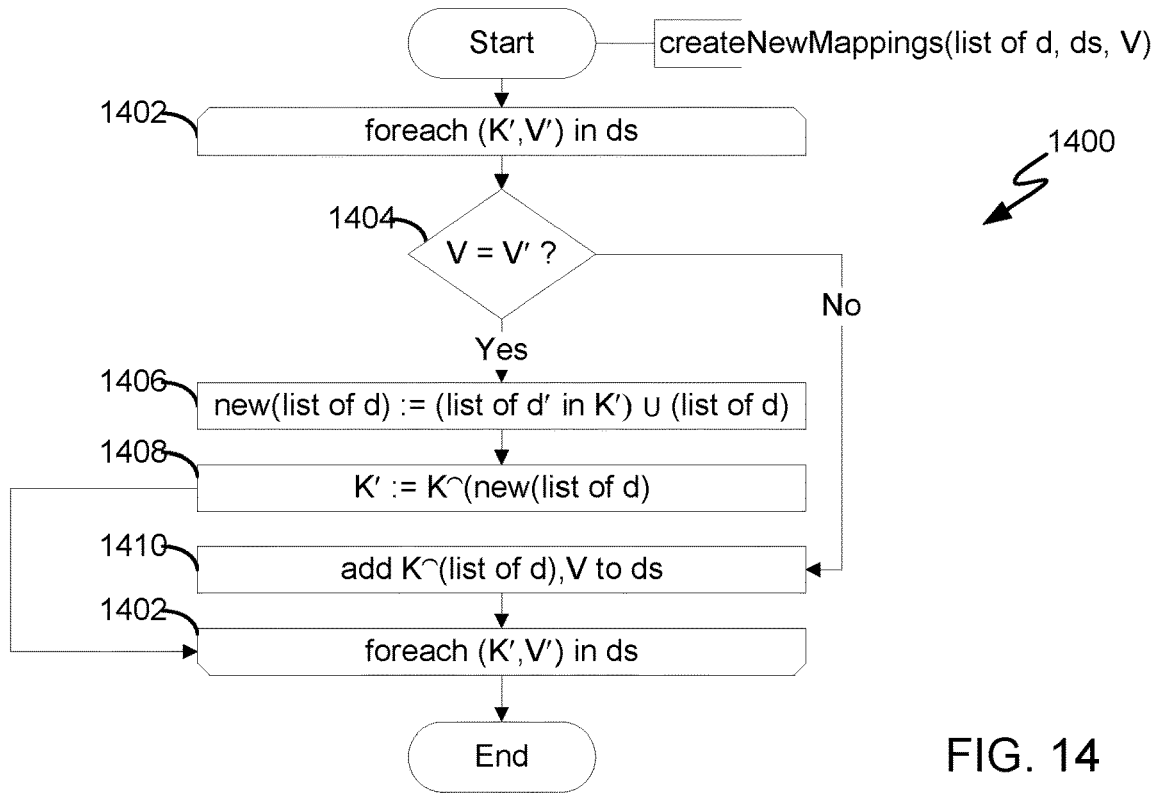
FIG. 14 depicts the createNewMappings function.

FIG. 14 depicts flow 1400 for the createNewMappings (list of d, ds, V) function executed by the NestDB server. In step 1402, the function starts an iterator over each (K', V') pair in ds. V' designates the value found in the composite database to distinguish it from the given value V in the function call. In step 1404, the function tests whether the given V is equal to the V' in the K', V' pair. If so, then in step 1406, the function computes a new(list of d) as the union of the list of d' in K' and the given (list of d). In step 1408, the function computes a new augmented key, K' by concatenating the current key K with new(list of d). If the given V is not equal to V', then in step 1410, the function simply adds K ⌢ (list of d), V to ds.

Figure 15:
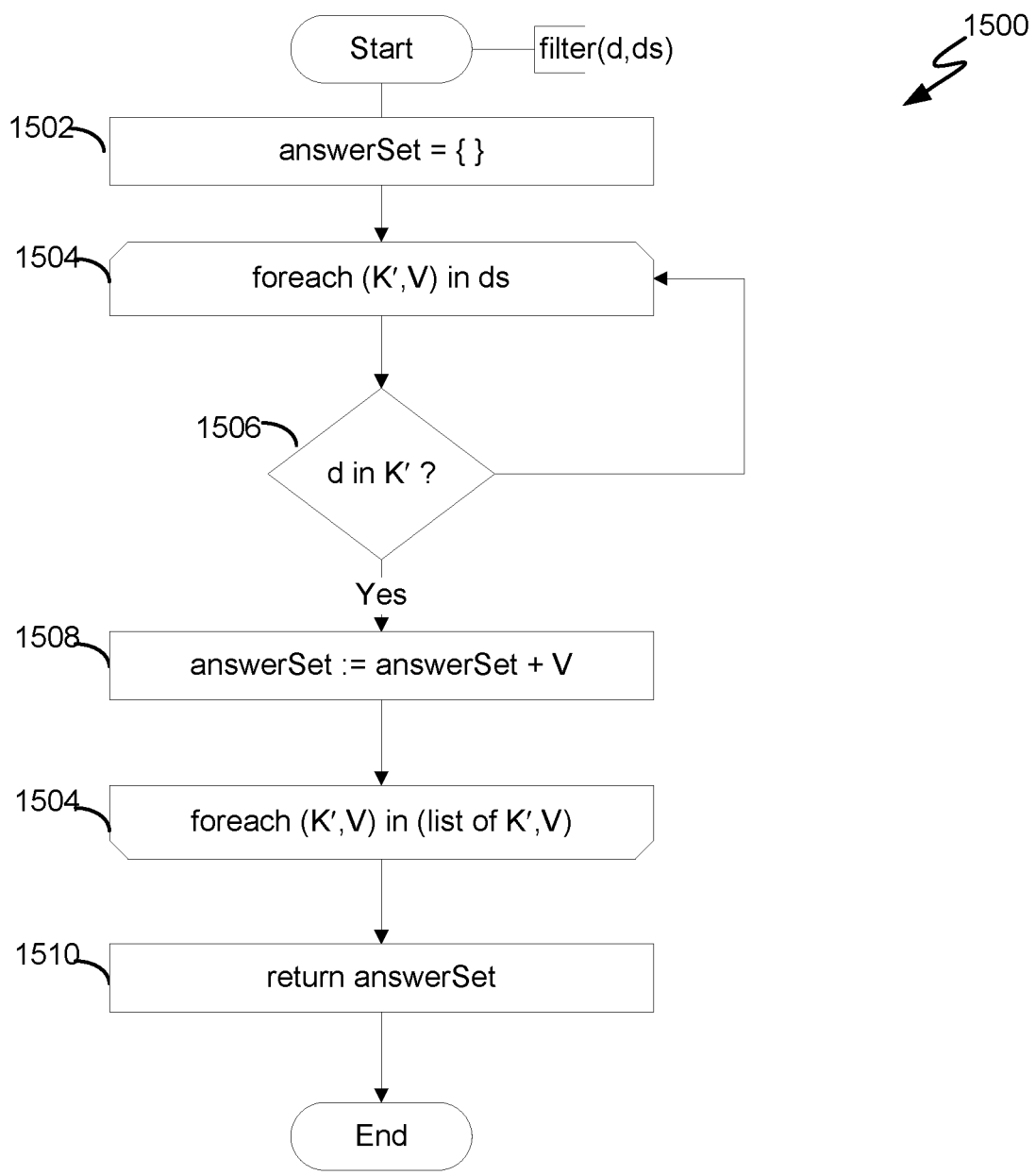
FIG. 15 depicts the filter(d, ds) function.

FIG. 15 depicts flow 1500 for the function filter(d, ds). In step 1502, an answer set is initialized to the empty set. In step 1504, the function starts an iterator over the (K', V) pairs in ds. In step 1506, the function determines whether the value d is found in the augmented key of the current augmented (K', V) pair. If so, in step 1508 function adds the value V in the current (K', V) pair to the answer set. Upon completing the iteration, the function returns the answer set in step 1510.

Figure 16:
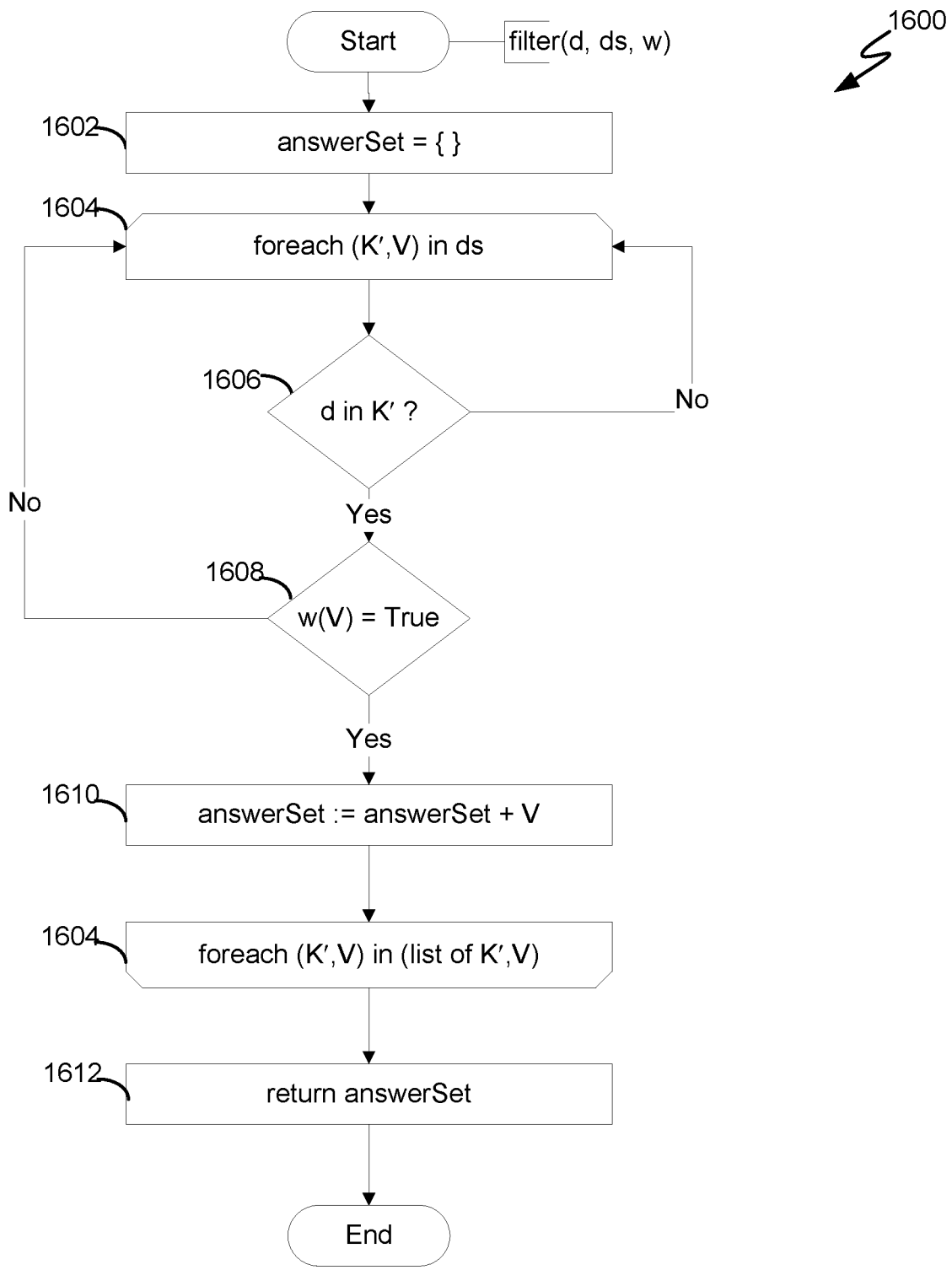
FIG. 16 depicts the filter(d, ds, w) function.

FIG. 16 depicts flow 1600 for the function filter(d, ds, w). In step 1602, an answer Set is initialized to the empty set. In step 1604, the function starts an iterator over the (K', V) pairs in ds. In step 1606, the function determines whether the value d is found in the augmented key of the current augmented (K', V) pair. If so, in step 1608, the function determines whether the value of the condition is true for V. If so, then in step 1610, the function adds the value V in the current (K', V) pair to the answer set. If the function finds that the test in step 1606 or 1608 is not met, then the function continues the iteration. Upon completing the iteration, the function returns the answer set in step 1612.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operation system in which at least one application runs. It should be noted that these embodiments may also apply to other examples of contexts, such as containers not including a guest operation system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system. Computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method for performing an operation on a composite database for a given key, the composite database containing information regarding virtualized objects of a plurality of contexts in a transport node of a virtualized network, each of the plurality of contexts being associated with a corresponding database identifier of a plurality of database identifiers, the composite database comprising a plurality of augmented key-value pairs, the method comprising:

finding a list of augmented key-value pairs of the plurality of augmented key-value pairs comprising an augmented key including the given key, wherein each augmented key-value pair of the plurality of augmented key-value pairs comprises a corresponding augmented key associated with a corresponding value, each augmented key comprising a corresponding key and one or more database identifiers;

wherein when the operation is a delete operation, the delete operation includes:
specifying a given list of database identifiers; and
removing all old records having a database identifier in the given list of database identifiers from the list of augmented key-value pairs;

wherein when the operation is a put operation, the put operation includes:
specifying a given list of data base identifiers and a given value;
removing all old records having database identifiers in the given list from the list of augmented key-value pairs; and adding new records with the given value and the given list of database identifiers to the list of augmented key-value pairs; and
wherein when the operation is a get record operation, the get record operation includes:
specifying a given database identifier and a key; and
finding a record in the list of augmented key-value pairs having the given database identifier.

2. The method of claim 1, wherein each key in each augmented key-value pair of the plurality of augmented key-value pairs is a concatenation of an object type and an identifier for a particular instance of the object type.

3. The method of claim 1, wherein the delete operation and put operation include removing any old records in the composite database based on the given list of database identifiers and the list of augmented key-value pairs, wherein the old records are those whose database identifiers in each list of identifiers in the list of augmented key-value pairs that overlap with the given list of database identifiers.

4. The method of claim 3, wherein removing any old records in the composite database includes:
for each augmented key-value pair in the list of augmented key-value pairs,
computing a list of identifiers from a list of identifiers derived from the augmented key-value pair and an intersection of given list of identifiers; and
if the intersection is not null, removing the computed list from the augmented key-value pair.

5. The method of claim 1, wherein the put operation includes creating new records in the composite database based on the given list of database identifiers, the given value and the list of augmented key-value pairs, the new records having the given key and the given value for each of the database identifiers in the given list of database identifiers.

6. The method of claim 5, wherein creating new records in the composite database based on the given list of database identifiers and given value includes:
for each augmented key-value pair in the list of augmented key-value pairs,
determining whether or not the given value matches the value in the augmented key-value pair, the augmented key in the augmented key value pair including a current key,
if so, computing a new list of database identifiers from the list of identifiers derived from the augmented key-value pair and a union of the given list of identifiers, and computing a new augmented key based on the current key and the new list of database identifiers, and
if not, adding an augmented key-value pair with the given value to the list of augmented key-value pairs, the augmented key including the given list of identifiers.

7. The method of claim 1, wherein the get record operation includes:
for each augmented key-value pair in the list of augmented key-value pairs,
determining whether or not the given database identifier is in the augmented key of the augmented key-value pair; and
if so, then returning the value in the augmented key-value pair, and
if not, then returning an empty value.

8. A non-transient computer readable medium containing instructions for performing an operation on a composite database for a given key, the composite database containing information regarding virtualized objects of a plurality of contexts of a transport node in a virtualized network, each of the plurality of contexts being associated with a corresponding database identifier of a plurality of database identifiers, the composite database comprising a plurality of augmented key-value pairs wherein the instructions when executed by the one or more processors, cause the one or more processors to perform the steps of:
finding a list of augmented key-value pairs of the plurality of augmented key-value pairs comprising an augmented key including the given key, wherein each augmented key-value pair of the plurality of augmented key-value pairs comprises a corresponding augmented key associated with a corresponding value, each augmented key comprising a corresponding key and one or more database identifiers;
wherein when the operation is a delete operation, the delete operation includes:
specifying a given list of database identifiers; and
removing all old records having a database identifier in the given list of database identifiers from the list of augmented key-value pairs;
wherein when the operation is a put operation, the put operation includes:
specifying a given list of data base identifiers and a given value;
removing all old records having database identifiers in the given list from the list of augmented key-value pairs; and
adding new records with the given value and the given list of database identifiers to the list of augmented key-value pairs; and
wherein when the operation is a get record operation, the get record operation includes:
specifying a given database identifier and a key; and
finding a record in the list of augmented key-value pairs having the given database identifier.

9. The non-transient computer readable medium of claim 8, wherein each key in each augmented key-value pair of the plurality of augmented key-value pairs is a concatenation of an object type and an identifier for a particular instance of the object type.

10. The non-transient computer readable medium of claim 8, wherein the delete operation and put operation include removing any old records in the composite database based on the given list of database identifiers and the list of augmented key-value pairs, wherein the old records are those whose database identifiers in each list of identifiers in the list of augmented key-value pairs that overlap with the given list of database identifiers.

11. The non-transient computer readable medium of claim 10, wherein removing any old records in the composite database includes:
for each augmented key-value pair in the list of augmented key-value pairs,
computing a list of identifiers from a list of identifiers derived from the augmented key-value pair and an intersection of given list of identifiers, and
if the intersection is not null, removing the computed list from the augmented key-value pair.

12. The non-transient computer readable medium of claim 8, wherein the put operation includes creating new records in the composite database based on the given list of database identifiers, the given value and the list of augmented key-value pairs, the new records having the given key and the given value for each of the database identifiers in the given list of database identifiers.

13. The non-transitory computer readable medium of claim 12, wherein creating new records in the composite database based on the given list of database identifiers and given value includes:
  for each augmented key-value pair in the list of augmented key-value pairs,
    determining whether or not the given value matches the value in the augmented key-value pair, the augmented key in the augmented key value pair including a current key,
    if so, computing a new list of database identifiers from the list of identifiers derived from the augmented key-value pair and a union of the given list of identifiers, and computing a new augmented key based on the current key and the new list of database identifiers, and
    if not, adding an augmented key-value pair with the given value to the list of augmented key-value pairs, the augmented key including the given list of identifiers.

14. The non-transitory computer readable medium of claim 8, wherein the get record operation includes:
  for each augmented key-value pair in the list of augmented key-value pairs,
    determining whether or not the given database identifier is in the augmented key of the augmented key-value pair,
    if so, then returning the value in the augmented key-value pair, and
    if not, then returning an empty value.

15. A computer system comprising:
  one or more processors; and
  a composite database coupled to the one or more processors, the composite database containing information regarding virtualized objects of a plurality of contexts of a transport node in a virtualized network, each of the plurality of contexts being associated with a corresponding database identifier of a plurality of database identifiers, the composite database comprising a plurality of augmented key-value pairs; and
  a memory coupled to the one or more processors, the memory containing instructions which, when executed by the one or more processors, carry out the steps of:
    finding a list of augmented key-value pairs of the plurality of augmented key-value pairs comprising an augmented key including a given key, wherein each augmented key-value pair of the plurality of augmented key-value pairs comprises a corresponding augmented key associated with a corresponding value, each augmented key comprising a corresponding key and one or more database identifiers;
    wherein when the operation is a delete operation, the delete operation includes:
      specifying a given list of database identifiers; and
      removing all old records having a database identifier in the given list of database identifiers from the list of augmented key-value pairs;
    wherein when the operation is a put operation, the put operation includes:
      specifying a given list of data base identifiers and a given value;
      removing all old records having database identifiers in the given list from the list of augmented key-value pairs; and
      adding new records with the given value and the given list of database identifiers to the list of augmented key-value pairs; and
    wherein when the operation is a get record operation, the get record operation includes:
      specifying a given database identifier and a key; and
      finding a record in the list of augmented key-value pairs having the given database identifier.

16. The computer system of claim 15, wherein each key in each augmented key-value pair of the plurality of augmented key-value pairs is a concatenation of an object type and an identifier for a particular instance of the object type.

17. The computer system of claim 15, wherein the delete operation and put operation include removing any old records in the composite database based on the given list of database identifiers and the list of augmented key-value pairs, wherein the old records are those whose database identifiers in each list of identifiers in the list of augmented key-value pairs that overlap with the given list of database identifiers.

18. The computer system of claim 17, wherein removing any old records in the composite database includes:
  for each augmented key-value pair in the list of augmented key-value pairs,
    computing a list of identifiers from a list of identifiers derived from the augmented key-value pair and an intersection of given list of identifiers, and
    if the intersection is not null, removing the computed list from the augmented key-value pair.

19. The computer system of claim 15, wherein the put operation includes creating new records in the composite database based on the given list of database identifiers, the given value and the list of augmented key-value pairs, the new records having the given key and the given value for each of the database identifiers in the given list of database identifiers.

20. The computer system of claim 19, wherein creating new records in the composite database based on the given list of database identifiers and given value includes:
  for each augmented key-value pair in the list of augmented key-value pairs,
    determining whether or not the given value matches the value in the augmented key-value pair, the augmented key in the augmented key value pair including a current key,
    if so, computing a new list of database identifiers from the list of identifiers derived from the augmented key-value pair and a union of the given list of identifiers, and computing a new augmented key based on the current key and the new list of database identifiers, and
    if not, adding an augmented key-value pair with the given value to the list of augmented key-value pairs, the augmented key including the given list of identifiers.

* * * * *